Aug. 28, 1923.

A. G. HEROLD

COMBINED COFFEE SACK AND HOLDER

Filed Oct. 6, 1922

1,466,165

Inventor:
Arthur G. Herold,
by Pepper & Kingsland
His Attorneys.

Patented Aug. 28, 1923.

1,466,165

UNITED STATES PATENT OFFICE.

ARTHUR G. HEROLD, OF ST. LOUIS, MISSOURI.

COMBINED COFFEE SACK AND HOLDER.

Application filed October 6, 1922. Serial No. 592,903.

*To all whom it may concern:*

Be it known that I, ARTHUR G. HEROLD, a citizen of the United States, residing at St Louis County, Missouri, have invented a new and useful Combined Coffee Sack and Holder, of which the following is a specification.

This invention relates to a combined coffee sack and holder.

My invention comprises a coffee sack and holder therefor adapted for use in the usual coffee urns, in combination with a bail for use in placing the sack and holder in an urn and for removing the same therefrom in a more convenient manner than is possible with devices at present in use.

Another object of the invention is to provide an improved coffee sack and holder therefor comprising a split ring, and a manipulative device for connecting and disconnecting the ends of the ring to permit the sack to be placed thereon or removed therefrom.

Another object of the invention is to produce an improved coffee sack and holder embodying all of the improvements and advantages mentioned above or hereinafter disclosed.

In the drawings Fig. 1 is a view with parts in section showing my improved coffee sack and holder with the bail up-raised.

Figure 1:
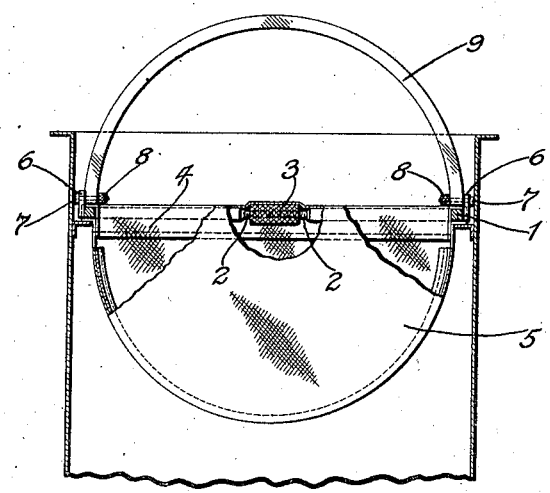
Figure 2:
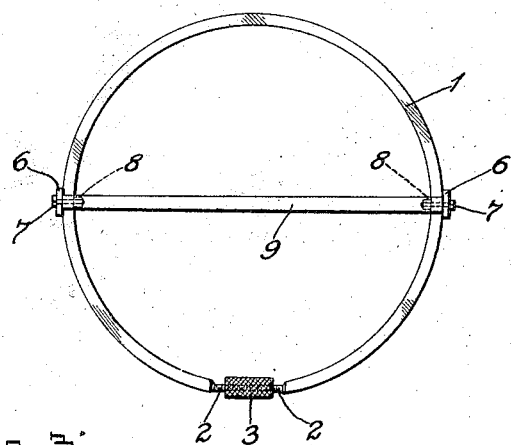
Fig. 2 is a plan view of the holder and bail without the sack.

In the construction shown in Figs. 1 and 2 the ring 1 may be made of any appropriate material and dimensions and is provided with axially alined threaded portions 2 on its ends. The threads on the portions 2 preferably turn in the same direction and are designed and adapted to receive an internally threaded sleeve or nut 3, the threads in which run in the same direction as the threads on the axially alined portions 2 of the ring. Thus when the sleeve or nut 3 is applied it is first screwed onto one of the portions 2 and the other threaded portion 2 is then placed in position to enter the sleeve or nut, after which the sleeve or nut is turned in a direction to unscrew it from the portion 2 on which it was first placed and to screw it onto the other portion 2 a sufficient distance to form a firm connection between the ends of the ring. The ends of the ring are connected only after the ring has been placed through the loop 4 formed at the open upper end of the bag 5.

A pair of ears 6 are formed on the ring 1 in diametrically opposite positions and preferably on the outer side of the ring. Said ears extend upwardly a sufficient distance to have holes formed in them to receive the pivots 7 in the form of bolts or screws having heads on one end and threads on their opposite ends to receive removable nuts 8.

The bail 9 is of any desired shape and has holes through its ends to receive the pivots 7 above the loop of the bag secured to the ring 1. Openings are formed through the loop 4 of the bag through which the ears 6 extend, leaving the pivotal connection between the bail and the ring 1 free to operate without interference by the bag.

Figure 3:
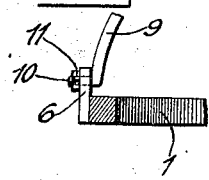
Fig. 3 is a sectional view showing a modified form of connection of the bail with the ring.

In the construction shown in Fig. 3 the bail 9 has an outward extension 10 on each end adapted to extend through the holes in the ears 6 and being threaded to receive nuts 11 to retain the bail in connection with the ring.

The ring and the bail may be made of any desired material, or of different materials. The device is a genuine convenience and the bail constitutes means whereby the bag may be placed in or withdrawn from a heated coffee urn without danger of burning the fingers or the hand as often occurs in the use of coffee bags heretofore employed.

I am aware that the invention may be varied in equivalent particulars without departure from the nature and principle thereof.

I do not restrict myself unessentially, but what I claim and desire to secure by Letters Patent is:—

1. A combined coffee sack and holder, comprising a split ring adapted to be passed endwise through a loop of a sack, a sack, a loop on the sack for receiving said ring as aforesaid and having diametrically opposite openings therein, diametrically opposite ears on the ring extending through said openings in the loop on the sack, and a bail pivotally united with said ears.

2. A combined coffee sack and holder, comprising a split ring adapted to be passed endwise through a loop of a sack, a sack, a loop on the sack for receiving said ring as aforesaid and having diametrically opposite openings therein, diametrically opposite ears on the ring extending through said openings in the loop on the sack, a bail removably pivoted to said ears, and means cooperating with the ends of the ring to hold the ring in proper annular form.

ARTHUR G. HEROLD.